United States Patent
Hambloch et al.

(10) Patent No.: US 10,103,678 B2
(45) Date of Patent: Oct. 16, 2018

(54) METHOD FOR CONTROLLING AN ELECTRIC MOTOR

(71) Applicants: TRW Limited, West Midlands (GB); TRW Automotive GmbH, Alfdorf (DE)

(72) Inventors: Peter Hambloch, Duesseldorf (DE); James Owen Patrick Farrelly, Kenilworth (GB)

(73) Assignees: TRW Limited, Solihull, West Midlands (GB); TRW Automotive GmbH, Alfdorf (DE)

( * ) Notice: Subject to any disclaimer, the term of this patent is extended or adjusted under 35 U.S.C. 154(b) by 0 days.

(21) Appl. No.: 15/327,183

(22) PCT Filed: Jun. 9, 2015

(86) PCT No.: PCT/EP2015/062776
§ 371 (c)(1),
(2) Date: Jan. 18, 2017

(87) PCT Pub. No.: WO2016/008644
PCT Pub. Date: Jan. 21, 2016

(65) Prior Publication Data
US 2017/0163203 A1    Jun. 8, 2017

(30) Foreign Application Priority Data
Jul. 18, 2014    (DE) .......... 10 2014 110 110

(51) Int. Cl.
*H02P 29/68* (2016.01)
*B62D 5/04* (2006.01)

(52) U.S. Cl.
CPC ............ *H02P 29/68* (2016.02); *B62D 5/0496* (2013.01)

(58) Field of Classification Search
CPC ...... H02H 7/0852; H02H 7/085; H02H 5/042; H02H 7/0822; H02K 11/0047
(Continued)

(56) References Cited

U.S. PATENT DOCUMENTS

2006/0155452 A1    7/2006  Strenkert
2009/0276121 A1*  11/2009  Limpibunterng .... B62D 5/0463
                                                     701/41

(Continued)

FOREIGN PATENT DOCUMENTS

DE    102004002761 A1    11/2005
DE    102008055873 A1    11/2009

(Continued)

OTHER PUBLICATIONS

German Search Report, Application No. DE 102014110110.3, dated May 28, 2015.

(Continued)

*Primary Examiner* — Kawing Chan
*Assistant Examiner* — Bradley Brown
(74) *Attorney, Agent, or Firm* — MacMillan, Sobanski & Todd, LLC

(57) ABSTRACT

A method of controlling an electric motor of a drive device of a power steering system, in which a temperature sensor senses the temperature of the drive device and transmits information about the temperature of the drive device to an evaluation unit, the evaluation unit estimates the temperature of a gearbox based on the temperature of the drive device, and, based on the estimated temperature of the gearbox, the evaluation unit adjusts a requested torque of the electric motor.

15 Claims, 1 Drawing Sheet

(58) Field of Classification Search
USPC ......................................................... 318/473
See application file for complete search history.

(56) References Cited

U.S. PATENT DOCUMENTS

2012/0133314 A1* 5/2012 Kozarekar .............. B60L 1/003
　　　　　　　　　　　　　　　　　　　　　　318/473
2017/0074334 A1* 3/2017 Loktev .................... F16D 48/06

FOREIGN PATENT DOCUMENTS

| DE | 102011111421 A1 | 2/2013 |
| EP | 2061691 B1 | 4/2012 |
| WO | 2008032197 A1 | 3/2008 |

OTHER PUBLICATIONS

PCT International Search Report and Written Opinion, Application No. PCT/EP2015/062776, dated Sep. 7, 2015.

* cited by examiner

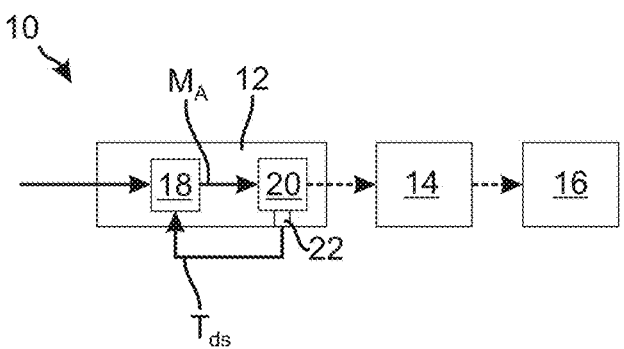
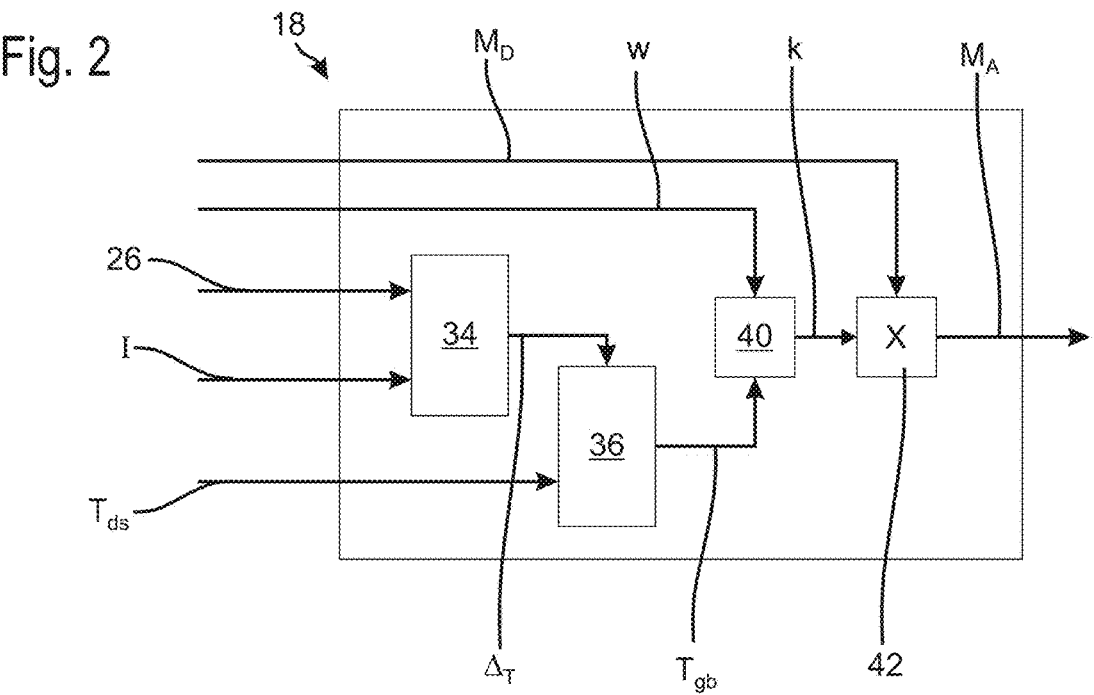

ured using the phase current or the manual torque, a factor of k is determined which is utilized for compensating temperature influences on the requested motor torque.
METHOD FOR CONTROLLING AN ELECTRIC MOTOR

CROSS-REFERENCE TO RELATED APPLICATIONS

This application is a national stage of International Application No. PCT/EP2015/062776, filed 9 Jun. 2015, the disclosures of which are incorporated herein by reference in entirety, and which claimed priority to German Patent Application No. 10 2014 110 110.3, filed 18 Jul. 2014, the disclosures of which are incorporated herein by reference in entirety.

BACKGROUND OF THE INVENTION

The invention relates to a method of controlling an electric motor of a drive device of a power steering system.

In the case of power steering systems of vehicles, in particular with electrically operated power steering systems, the steering feel of the vehicle changes with the outside temperature since the outside temperature dictates the temperature of the power steering system when the vehicle has not been used for a longer period of time. In particular at temperatures below 0° C. (32° F.), a driver will perceive that the steering feel has changed. At these temperatures, the steering is dampened and seems to be heavier or stiffer.

This phenomenon is attributable to the material properties of the gearbox, in particular of the lubricant, and of the motor of the power steering system since these exhibit a higher stiffness and viscosity at low temperatures.

In order to counteract this change in steering feel, it is known to increase, at low temperatures, the assist torque that is applied by the electric motor of the drive device. To this end, the temperature of the electric motor is made use of. This solution, however, is not sufficient since the change in steering feel is for the most part dependent on the gearbox, in particular on the lubricant used.

BRIEF SUMMARY OF THE INVENTION

It is a feature of the invention to provide a method of controlling a power steering system in which the temperature of the gearbox is also taken into account.

The present invention provides a method of controlling an electric motor of a drive device of a power steering system in which a temperature sensor senses the temperature of the drive device and transmits information about the temperature of the drive device to an evaluation unit, the evaluation unit estimates the temperature of a gearbox based on the temperature of the drive device, and based on the estimated temperature of the gearbox, the evaluation unit adjusts a requested torque of the electric motor.

The invention allows, without any major effort, more particularly without a further temperature probe, the temperature of the gearbox to be determined with sufficient precision, so that the requested torque of the electric motor, which serves to provide a steering assistance to the driver, can be adjusted to the temperature conditions. If the temperature estimation is sufficiently precise, this can be done without influencing other application identifiers and in a variant-independent manner. On the basis of the estimated temperature of the gearbox and the load of the gearbox as measured, the temperature-induced friction can be precisely estimated, so that the friction can be exactly compensated and the driver does not perceive any change in the steering feel. This is applicable in particular both at especially high and at especially low temperatures.

Stated in general terms, according to the invention, in dependence on an estimated temperature of the gearbox and the load applied, e.g. as measured using the phase current or the manual torque, a factor of k is determined which is utilized for compensating temperature influences on the requested motor torque.

The drive device here comprises at least the electric motor, but, for example, also a control unit, a power supply and/or a motor controller of the electric motor.

For estimating the temperature of the gearbox, preferably a predetermined temperature difference between the gearbox and the drive device is made use of and the characteristics thereof are used, as a result of which the estimation of the temperature of the gearbox is simplified.

For example, for predetermining the temperature difference, information on a radiation of heat from components of the drive device is made use of, in particular information about the heat radiated from the evaluation unit and further electronic components, about the heat radiated from the current-carrying, non-rotating electric motor and/or about the heat radiated by the rotation of the electric motor. In this way, the temperature difference between the drive device and the gearbox can be determined on the basis of the operating condition of the electric motor.

In one embodiment, the heat radiated from the evaluation unit (control unit) and the further electronic components and/or the heat radiated from the current-carrying, non-rotating electric motor is assumed to be constant, which further simplifies the determination of the temperature difference. It is also possible to assume the radiated heat as a function of the current consumption of the drive device.

For example, the information about the heat radiated by the rotation of the electric motor is ascertained based on the current supplied to the electric motor, in particular with the aid of a lookup table, so that this information is also gained from information that is already known, as a result of which no additional sensors are required.

In one variant embodiment of the invention, the (known) thermal mass of the drive device is made use of for estimating the temperature of the gearbox, since the size of the thermal mass of the drive device affects the thermal transfer between the drive device and the gearbox. In this way, taking the thermal mass of the drive device into account allows a more precise estimation of the temperature of the gearbox.

Preferably, the heat transfer between the drive device and the gearbox is made use of for estimating the temperature of the gearbox, so that the temperature of the gearbox can be estimated on the basis of the temperature of the drive device.

In one configuration of the invention, in the underlying thermal model for estimating the temperature of the gearbox, the gearbox changes its temperature very slowly in comparison with the drive device; in particular it is assumed that $$\frac{d}{dt}T_{gb} = 0,$$

where $T_{gb}$ is the estimated temperature of the gearbox. In this way, the high thermal inertia of the gearbox as compared to the thermal inertia of the drive device can be taken into account, the thermal inertia of the gearbox being caused primarily by it being connected with body parts and parts of the steering.

In a further configuration of the invention, the evaluation unit additionally adjusts the requested torque on the basis of the rotational velocity of the steering shaft as ascertained, which is in compliance with the driver's requirement and can prevent overcompensations.

Preferably, the adjustment of the requested torque is effected by multiplication of the requested torque by a factor of k, which in particular is in the range between 0.8 and 1.2, so that an adjustment of the requested torque of the electric motor can be effected in a simple manner. The limitation of the factor of k to a range between 0.8 and 1.2 is done for safety reasons. Here, the estimated temperature of the gearbox may be made use of for ascertaining the factor of k.

Ascertaining the factor of k is effected with the aid of a three-dimensional value card, for example, which accelerates the ascertainment of the factor of k.

In a further variant embodiment, the temperature of the electric motor itself is made use of instead of the temperature of the drive device, the parameters which relate to the drive device then relating to the electric motor, such as the temperature difference, the thermal mass and/or the heat transfer.

Other advantages of this invention will become apparent to those skilled in the art from the following detailed description of the preferred embodiments, when read in light of the accompanying drawings.

BRIEF DESCRIPTION OF THE DRAWINGS

FIG. 1 shows a schematic illustration of a power steering system for carrying out the method according to the invention; and FIG. 2 shows a schematic flowchart of the method according to the invention.

DETAILED DESCRIPTION OF THE INVENTION

FIG. 1 schematically illustrates a power steering system 10. The power steering system includes a drive device 12, a gearbox 14, and a steering arrangement 16.

The steering arrangement 16 is representative of the steering system of the vehicle and includes, for example, a steering control element, a steering shaft, a steering gear and a steering rod which transfer the steering force of the driver from the steering control element to the wheels of the vehicle.

The drive device 12 includes an evaluation unit 18 and an electric motor 20 which is connected to the gearbox 14. The gearbox 14, in turn, is connected to one of the components of the steering arrangement 16, such as, e.g., to the steering shaft or the steering rod.

Furthermore, the drive device 12 has a temperature sensor 22 provided thereon or therein, which detects the temperature $T_{ds}$ of the drive device 12 or of the electric motor 20 and transmits a respective temperature signal to the evaluation unit 18. The evaluation unit 18 moreover receives further signals from additional sensors.

In addition, a control unit (not shown) may be provided in the drive device 12.

In operation, based on the driving situation and/or the steering movement of the driver, the control unit requests a torque $M_D$ which constitutes the torque for providing steering assistance to the driver, to which no temperature-related adjustments have been made.

The evaluation unit 18 now adjusts the torque $M_D$ to the temperature conditions and transmits the adjusted torque $M_A$ to the electric motor.

On the basis of the adjusted torque $M_A$ ascertained in this way, a motor controller (not shown) controls the current supply to the electric motor 20 such that the electric motor 20 provides the adjusted torque $M_A$.

The torque generated by the electric motor 20 is subsequently transferred to the steering arrangement 16 by means of the gearbox 14 and assists the driver in steering the vehicle. The transfer of the torque is illustrated by the dashed arrows in FIG. 1.

The method of ascertaining the adjusted torque $M_A$ and thus the method of controlling the electric motor 20 is illustrated schematically in FIG. 2.

FIG. 2 shows a flowchart of the method carried out by the evaluation unit 18. The evaluation unit 18 receives signals indicative of the operating condition of the power steering system 10 from various sensors of the power steering system 10, in particular from the temperature sensor 22.

In the exemplary embodiment illustrated in FIG. 2, the evaluation unit 18 receives information about the temperature $T_{ds}$ of the drive device 12 and about the current I supplied to the electric motor 20 as well as an information 26 on whether the electric motor 20, in particular together with the motor controller, was turned on.

In addition, the evaluation unit 18 may receive information about the rotational velocity ω of the steering shaft and the requested torque $M_D$.

In a first step, in block 34 an expected temperature difference $\Delta_T$ between the drive device 12 and the gearbox 14 is predetermined. To this end, information 26 about the operating condition of the electric motor 20 and information about the current I is supplied to block 34.

The temperature difference $\Delta_T$ here is composed of a plurality of parts. In the embodiment shown, these are up to three parts.

The first part is a constant term which allows for the radiation of heat from the evaluation unit 18 and from further electronic components of the drive device 12. This constant may be stored in the evaluation unit 18.

The second part takes the additional radiation of heat of the current-carrying, non-rotating electric motor 20 and/or of the motor controller into consideration and is also constant. This constant may also be stored in the evaluation unit 18. It is added to the first part if the information 26 about the operating condition of the electric motor 20 indicates a turned-on motor and/or motor controller.

The third part of the temperature difference $\Delta_T$ is not constant. To calculate it, the current I supplied to the electric motor 20 is taken into account since the heat radiated from the electric motor 20 is dependent on the speed thereof as brought about by the current I.

For example, the third part is roughly proportional to the sum of the squares of the current I.

The third part may be determined based on a lookup table here.

The temperature difference $\Delta_T$ ascertained in this way in block 34 is passed to block 36, which furthermore receives the temperature $T_{ds}$ of the drive device 12 from the temperature sensor 22. In block 36, the temperature $T_{gb}$ of the gearbox 14 is now estimated with the aid of a thermal model of the drive device 12 and of the gearbox 14. In doing so, it can be assumed that the temperature $T_{gb}$ of the gearbox changes only slowly in comparison with the temperature $T_{ds}$ of the drive device 12, in particular that $$\frac{d}{dt}T_{gb} = 0.$$

It is also conceivable that the thermal mass of the drive device 12 and/or the heat transfer between the drive device 12 and the gearbox 14 are made use of for estimating the temperature $T_{gb}$ of the gearbox 14. These quantities may be stored in the evaluation unit 18 as constants or as a value card.

Also, the temperature difference $\Delta_T$ predetermined by block 34 is made use of to estimate the temperature $T_{gb}$ of the gearbox and is input in the thermal model.

Block 36 passes the estimated temperature $T_{gb}$ of the gearbox 14 to block 40. In block 40, a factor of k is now ascertained, which serves to adapt the requested torque $M_D$. To this end, in addition to the temperature $T_{gb}$ of the gearbox 14, information about the rotational velocity ω of the steering shaft may also be provided to block 40.

The factor of k is determined in block 40 with the aid of a three-dimensional value card, in which the rotational velocity ω of the steering shaft may also be taken into account. Furthermore, the estimated temperature $T_{gb}$ of the gearbox and the load (steering torque or motor current) may also be taken into account.

The value of the factor of k is in the range between 0.8 and 1.2, for example.

The factor of k ascertained in this way is now passed on by block 40 to block 42, which furthermore receives the requested torque $M_D$ from the control unit. In block 42, the requested torque $M_D$ is only multiplied by the factor of k and the requested torque $M_D$ is thereby adjusted to the estimated temperature $T_{gb}$ of the gearbox.

The torque $M_A$ adjusted in this way is transmitted by the evaluation unit 18 to the electric motor 20 and/or the motor controller, so that the steering assistance generated is adapted to the estimated temperature $T_{gb}$ of the gearbox 14.

It is also conceivable that use is made of the temperature of the electric motor 20 itself rather than of the temperature $T_{ds}$ of the drive device 12, the parameters which relate to the drive device 12 then relating to the electric motor 20, such as the temperature difference $\Delta_T$, the thermal mass, the thermal models and/or the heat transfer. In this embodiment, the temperature sensor 22 would detect the temperature of the electric motor 20 and transmit it to the evaluation unit 18.

Also, it is conceivable that the control unit and the evaluation unit 18 are embodied by a microprocessor, so that there are no separate components. The motor controller may also be embodied in such microprocessor.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A method of controlling an electric motor of a drive device of a power steering system, in which
a temperature sensor senses the temperature of the drive device and transmits information about the temperature of the drive device to an evaluation unit,
the evaluation unit regularly estimates the temperature of a gearbox based on the current temperature of the drive device, and
based on the estimated temperature of the gearbox, the evaluation unit adjusts a requested torque of the electric motor,
wherein the adjustment of the requested torque is effected by multiplication of the requested torque by a factor of k, and
wherein ascertaining the factor of k is effected with the aid of a three-dimensional value card.

2. The method according to claim 1, wherein for estimating the temperature of the gearbox, a predetermined temperature difference between the gearbox and the drive device is made use of.

3. The method according to claim 1, wherein for predetermining the temperature difference, information on the radiation of heat from components of the drive device is made use of.

4. The method according to claim 3, wherein the heat radiated from the evaluation unit and further electronic components and/or the heat radiated from the electric motor s assumed to be constant.

5. The method according to claim 3, wherein the information about the heat radiated by the rotation of the electric motor is ascertained based on the current supplied to the electric motor.

6. The method according to claim 1, wherein the heat transfer between the drive device and the gearbox is made use of for estimating the temperature of the gearbox.

7. The method according to claim 1, wherein the thermal mass of the drive device is made use of for estimating the temperature of the gearbox.

8. The method according to claim 1, wherein in an underlying thermal model for estimating the temperature of the gearbox, the gearbox changes its temperature very slowly in comparison with the drive device.

9. The method according to claim 1, wherein the evaluation unit additionally adjusts the requested torque on the basis of a rotational velocity of a steering shaft as ascertained.

10. The method according to claim 1, wherein the temperature of the electric motor is made use of instead of the temperature of the drive device, instead of the temperature of the drive device the temperature of the electric motor is used, wherein the parameters relating to the drive device relate to the electric motor.

11. The method according to claim 3, wherein information on the radiation of heat from the components of the drive device is information about the heat radiated from the evaluation unit and further electronic components, about the heat radiated from the electric motor and/or about the heat radiated by the rotation of the electric motor.

12. The method according to claim 5, wherein the information about the heat radiated by the rotation of the electric motor is ascertained based on the current supplied to the electric motor with the aid of a lookup table.

13. The method according to claim 1, wherein in the underlying thermal model for estimating the temperature of the gearbox, the gearbox changes its temperature very slowly in comparison with the drive device according to $$\frac{d}{dt}T_{gb} = 0.$$

14. The method according to claim 1, wherein the factor of k is in the range between 0.8 and 1.2.

15. The method according to claim 10, wherein the parameters are the temperature difference, the thermal mass and/or the heat transfer.

\* \* \* \* \*